(No Model.)
P. WHITE.
WATER CLOSET.
No. 443,419.
Patented Dec. 23, 1890.
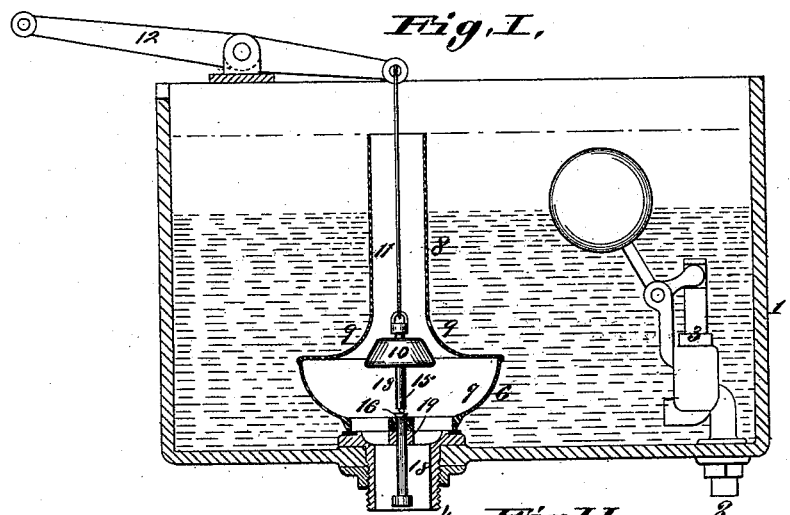
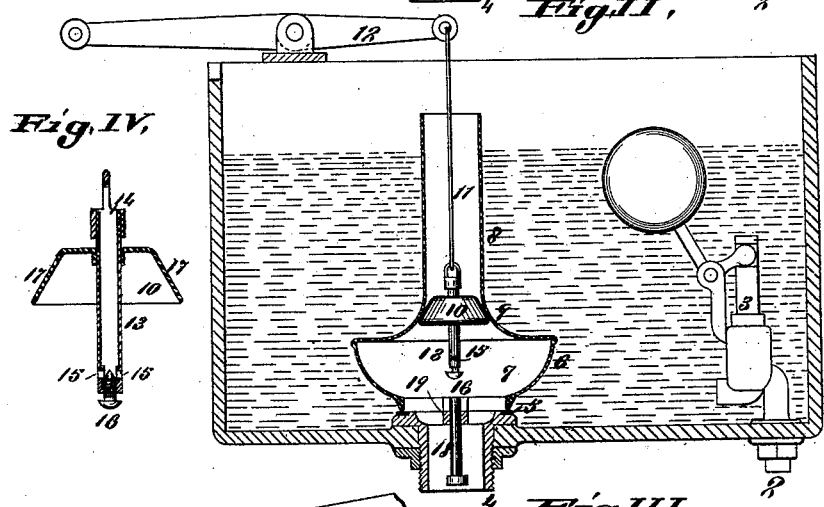
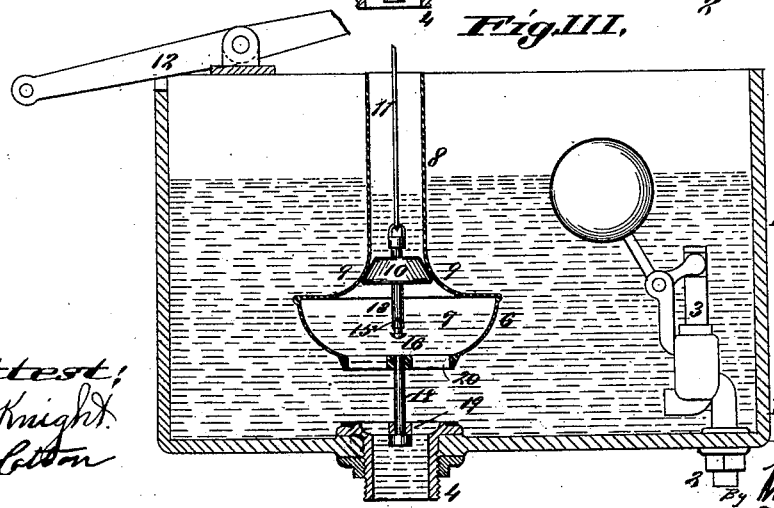
Attest:
S. H. Knight
S. Cotton
Inventor:
Peter White
By Knight Bro?
attys

UNITED STATES PATENT OFFICE.

PETER WHITE, OF ST. LOUIS, MISSOURI.

WATER-CLOSET.

SPECIFICATION forming part of Letters Patent No. 443,419, dated December 23, 1890.

Application filed October 20, 1890. Serial No. 368,693. (No model.)

*To all whom it may concern:*

Be it known that I, PETER WHITE, of the city of St. Louis, in the State of Missouri, have invented a certain new and useful Improvement in Water-Closets, of which the following is a full, clear, and exact description, reference being had to the accompanying drawings, forming part of this specification.

My invention relates to certain improvements in water-closets; and my invention consists in features of novelty hereinafter fully described, and pointed out in the claims.

Figure I is a vertical section illustrative of my invention and showing the parts in their normal position. Fig. II is a similar view showing the valve raised but the float resting on its seat. Fig. III is a similar view showing the float raised. Fig. IV is an enlarged vertical section of the valve.

Referring to the drawings, 1 represents a tank or cistern, having the usual supply-pipe 2 and float-valve 3.

4 represents the pipe leading from the tank to the bowl. On the upper end of this pipe, within the tank, is a seat 5, over which is a float 6, having a chamber 7, above which extends a hollow neck or tube 8. The lower end of the neck or tube is preferably flared, as shown at 9, to form the seat of a valve 10. The valve is connected by a rod 11 to one end of an operating-lever 12.

13 represents a hollow stem passing through the valve and to which the valve is permanently secured. The stem is open at its upper end, as shown at 14, Fig. IV, and has openings or ports 15 at its lower end. The openings or ports 15 may be adjusted in size or regulated by means of a set-screw 16. The valve 10 is preferably in the form of an inverted cup with inclined walls 17, which when the valve is raised forms a tight joint with the flaring walls 9 of the lower end of the tube 8.

18 represents a stem on the lower end of the float and which works in a bridge or cross-piece 19 on the upper end of the pipe 4, and by which the float is guided to and from its seat.

The operation is as follows: The parts being in their normal position, as shown in Fig. I, a downward pull on the outer end of the lever 12 will first lift the valve 10 into the position shown in Fig. II, closing communication between the chamber 7 and the neck or tube 8. The further movement of the lever lifts the float 6 from its seat 5, as shown in Fig. III, and the water passes from the tank or cistern to the bowl through the pipe 4. As it does so, a portion of it passes through the lower open end 20 of the float and compresses the imprisoned air into the upper part of the chamber 7 and into the hollow valve 10. As soon as the parts are raised, as shown in Fig. III, the pressure on the lever 12 is released, and as the water passes from the tank to the bowl a portion of it escapes through the perforations 15, up through the tube 13, out at the upper end of the tube and into the hollow neck 8. The water will continue to run from the tank until a sufficient amount has escaped through the tube 13 to counterbalance the pressure of the imprisoned air beneath the valve 10. The valve 10 will then open and the air beneath it will escape through the tube 8, permitting the float to fall to its seat. The limit of time it takes for an amount of water to escape above the valve 10 may be regulated by the screw 16, and thus the duration of the wash be regulated.

An arrangement of this kind is very cheap and durable, has no springs or other parts liable to get out of order, and is sure in its operation.

I claim as my invention—

1. In combination with a tank and a discharge-pipe, the float arranged over the discharge-pipe and having a hollow neck, a movable valve within the float, and an operating-lever for raising the valve to close the communication between the hollow float and its neck, substantially as and for the purpose set forth.

2. In combination with a tank and a discharge-pipe, a float arranged over the pipe and having a hollow neck, a valve for closing communication between the float and its neck, a hollow tube to which the valve is secured and which has inlet ports or openings, and a lever for lifting the valve and float, substantially as and for the purpose set forth.

3. In combination with a tank and a discharge-pipe, a float located over the discharge-pipe and having a hollow neck, a valve, a hollow perforated tube to which the valve is secured, an adjustable screw in the lower end of said tube for regulating the size of its perforation, and a lever for first lifting the valve to close communication between the float and its hollow neck, and secondly for lifting the float and valve together, substantially as and for the purpose set forth.

4. In combination with a tank and discharge-pipe, the float 6, having an open lower end and provided with a hollow neck 8, having flaring connection with the float, an inverted cup-valve, a hollow perforated tube 13, to which the valve is secured, and an operating-lever, said valve having flaring sides, substantially as and for the purpose set forth.

PETER WHITE.

In presence of—
THOMAS KNIGHT,
A. M. EBERSOLE.